US007353009B2

(12) United States Patent
Cheng et al.

(10) Patent No.: US 7,353,009 B2
(45) Date of Patent: *Apr. 1, 2008

(54) COMBINED TRANSMITTER

(75) Inventors: Yu-Feng Cheng, Taipei (TW); Wen-Bo Liu, Taipei (TW); Ken-Ming Li, Taipei (TW); Vai-Hang Au, Taipei (TW); Zhen-Yu Song, Taipei (TW)

(73) Assignee: Via Technologies, Inc., Taipei (TW)

( * ) Notice: Subject to any disclaimer, the term of this patent is extended or adjusted under 35 U.S.C. 154(b) by 604 days.

This patent is subject to a terminal disclaimer.

(21) Appl. No.: 10/976,126

(22) Filed: Oct. 28, 2004

(65) Prior Publication Data

US 2005/0088429 A1    Apr. 28, 2005

Related U.S. Application Data

(60) Provisional application No. 60/514,606, filed on Oct. 28, 2003.

(51) Int. Cl.
*H04B 1/18* (2006.01)

(52) U.S. Cl. .................. 455/180.3; 455/280; 375/327; 375/376; 327/147; 327/159

(58) Field of Classification Search ............. 455/150.1, 455/179.1, 180.1, 180.2, 180.3, 255–280; 327/141, 144, 146, 147, 159; 375/322, 324, 375/327, 372–376
See application file for complete search history.

(56) References Cited

U.S. PATENT DOCUMENTS

| 5,402,244 | A | 3/1995 | Kim ........................ 358/261.2 |
| 6,687,322 | B1* | 2/2004 | Zhang et al. ............... 375/376 |
| 6,788,754 | B1* | 9/2004 | Liepe ........................... 375/375 |
| 6,993,109 | B2* | 1/2006 | Lee et al. ................... 375/376 |
| 7,228,116 | B2* | 6/2007 | Cheng et al. ............. 455/180.3 |
| 2002/0056137 | A1 | 5/2002 | Stewart et al. .............. 725/143 |

FOREIGN PATENT DOCUMENTS

| JP | 2001092425 A2 | 4/2001 |
| JP | 2001332691 A2 | 11/2001 |
| JP | 2003101975 A2 | 4/2003 |

* cited by examiner

*Primary Examiner*—Edward F. Urban
*Assistant Examiner*—Nhan T. Le
(74) *Attorney, Agent, or Firm*—Thomas, Kayden, Horstemeyer & Risley

(57) ABSTRACT

A combined transmission unit for TMDS signals and LVDS signals. First (LVDS) and second (TMDS) transmission units are both coupled to a first set of input terminals. A switching controller, according to a mode selection signal, enables the first transmission unit to transmit the first data on the set of input terminals to first external input units through a pair of first signal lines or enables the second transmission unit to transmit the first data on the set of input terminals to the second external input units through a pair of second signal lines.

20 Claims, 16 Drawing Sheets

COMBINED TRANSMITTER

This application claims the benefit of U.S. Provisional application No. 60/514,606, filed on Oct. 28, 2003.

BACKGROUND

The present invention relates to a transmitter, and more particularly, to a combined transmitter capable of transmitting low voltage differential signaling (LVDS) and transition minimized differential signaling (TMDS).

Low Voltage Differential Signaling (LVDS) is a high-speed, low power interface used by most notebook computer manufactures to create a direct digital connection between the central processing unit (CPU) and LCD display. It provides very high line transmission rate, requires little power and generates low noise levels. LVDS technology, optimized for short cable runs in an effort to transition LVDS technology to external desktop monitors failed.

FIG. 1A shows a conventional LVDS transmitter 10. The LVDS transmitter 10 converts data (RED, GREEN, BLUE, HSYNC, VSYNC and DE) to data streams for output to a corresponding receiver through signal lines by output drivers 141. FIG. 1B is a diagram of the output driver 141 and a corresponding input unit 182 of the receiver 18. As shown, the LVDS output driver 141 is a current mode line driver, creating a differential voltage at the input unit 182 of the receiver 18 by current steering. For example, the current Iref flows to ground through the signal line 19, the terminal impedance 2RT of about 100Ω and the signal line /19 by turning on switches A and the switches B off, and vice versa.

Transition Minimized Differential Signaling (TMDS) is an electrical standard used to transmit digital data to a display. The signal is optimized to reduce electromagnetic interference (EMI), which allows faster signal transfer with increased accuracy. The differential circuitry in TMDS allows complimentary limited amplitude signals to be transmitted over twisted pair wires rather than more expensive coaxial cable. The TMDS transmitter encodes and serially transmits a data stream over a TMDS link to a TMDS receiver. Video and sync information are serialized and sent over three sets of twisted pair wires, with an additional pair of wires transmitting a clock signal for timing.

FIG. 2A is a block diagram of a conventional TMDS transmitter 20. TMDS transmitter 20 converts video and sync information (R, G, B, HSYNC, VSYNC and DE) to data streams for output to the corresponding receiver through signal lines by output drivers 142. FIG. 2B is a diagram of the output driver 142 and a corresponding input unit 184 of the receiver 18'.

As shown in FIG. 2B, the TMDS output driver 142 is a current mode line driver, generating a differential signal over lines 191 and /191 by controlling the switches D and /D. For example, when the switch D is turned on, the current Idr on line 191 pulls down the voltage at the node N1 of the input unit 184 in a TMDS receiver 18' through the terminal impedance RT of about 50Ω. The other line /191, which carries no current at this time, is maintained at Avcc (3.3V), thus a differential voltage swing is achieved.

Currently, separate LVDS and TMDS transmitters in different chips are required for transmitting LVDS signals and TMDS signals.

SUMMARY

An object of the present invention is to provide a transmitter capable of transmitting LVDS signals and TMDS signals.

Embodiments of the present invention thus provide a combined transmitter capable of transmitting LVDS signals and TMDS signals. In the combined transmitter, a set of input terminal receives first data. A first transmission unit is coupled to the first set of input terminals and has a plurality of first drivers each capable of sending a first differential signal to a first external input unit through a pair of first signal lines. The first external input unit has a first resistor coupled between the first signal lines. A second transmission unit is coupled to the first set of input terminals and has a plurality of second drivers each capable of sending a second differential signal to a second external input unit through a pair of second signal lines. The second external input unit has second resistors, each coupled between a power rail in the second external input unit and one of the second signal lines. A switching controller, according to a mode selection signal, enables the first transmission unit to transmit the first data on the set of input terminals to the first external input units through the first signal lines or enables the second transmission unit to transmit the first data on the set of input terminals to the second external input units through the second signal lines.

Embodiments of the present invention also provide another combined transmitter capable of transmitting LVDS signals and TMDS signals. In the combined transmitter, a set of input terminal receives first data. First and second transmission units are coupled to the set of input terminals, and the first transmission unit has a plurality of first drivers capable of sending a first differential signal to a first external input unit through a pair of first signal lines. The first external input unit has a first resistor coupled between the first signal lines. The second transmission unit has a plurality of first drivers each capable of sending a second differential signal to a second external input unit through the pair of first signal lines. The second external input unit has second resistors each coupled between a power rail in the second external input unit and one of the first signal lines. A switching controller, according to a mode selection signal, enables the first transmission unit to transmit the first data on the set of the input terminal to the first external input units through the first signal lines or enables the second transmission unit to transmit the first data on the set of the input terminal to the second external units through the first signal lines.

BRIEF DESCRIPTION OF THE DRAWINGS

The present invention can be more fully understood by the subsequent detailed description and examples with reference made to the accompanying drawings, wherein.

DETAILED DESCRIPTION

FIRST EMBODIMENT

Figure 3A:
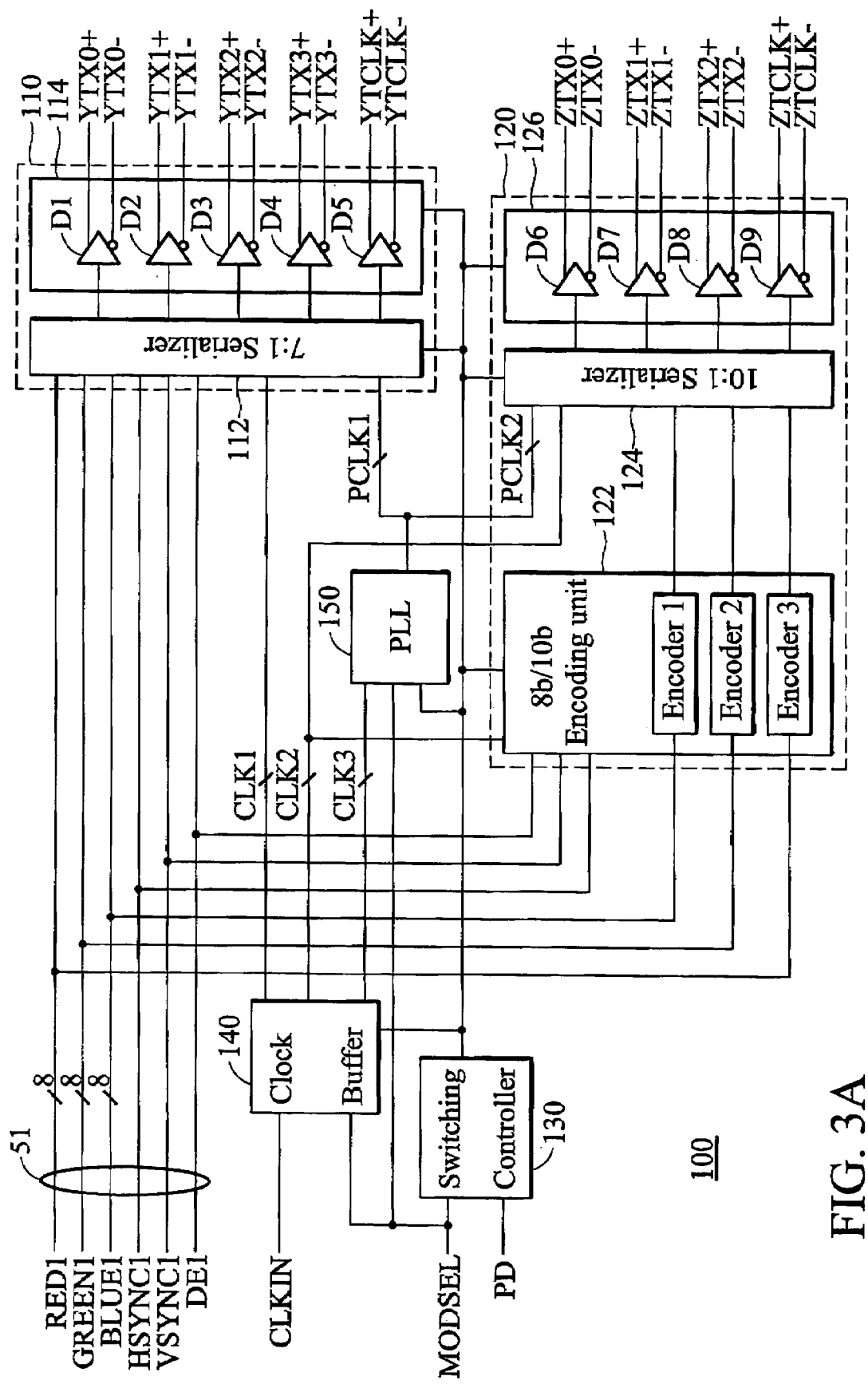
FIG. 3A shows a combined transmission unit according to a first embodiment of the present invention.

FIG. 3A is a schematic diagram of a combined transmitter capable of transmitting LVDS signals and TMDS signals according to a first embodiment of the present invention. As shown in FIG. 3A, the combined transmitter 100 comprises a first set of input terminals 51, a first transmission unit 110, a second transmission unit 120, a switching controller 130, a clock buffer 140 and a phase locked loop (PLL) 150. The set of input terminal 51 receives first data comprising video and sync information (RED1, GREEN1, BULE1, HSYNC1, VSYNC1 and DE1).

Figure 1A:
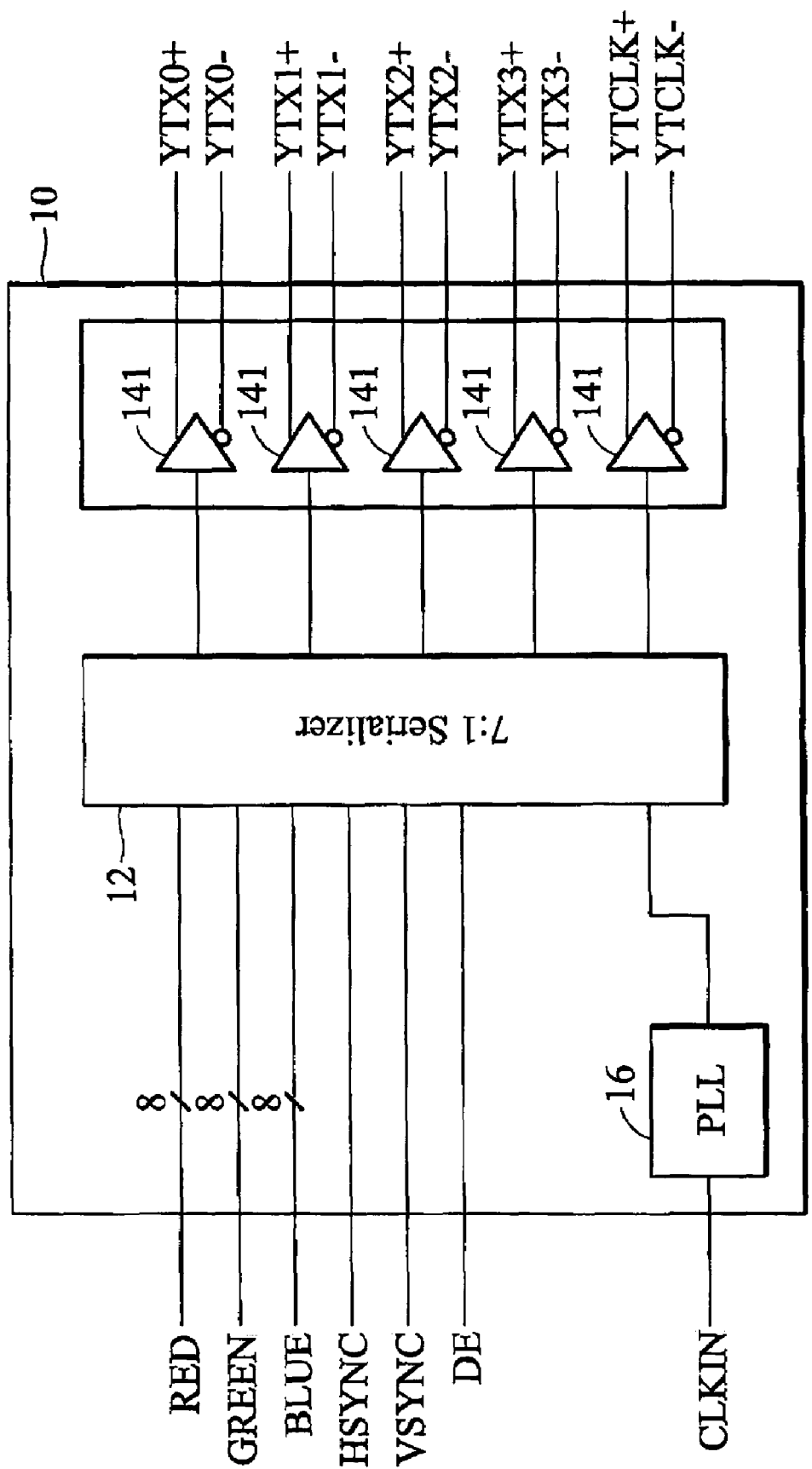
FIG. 1A shows a conventional LVDS transmitter.
Figure 1B:
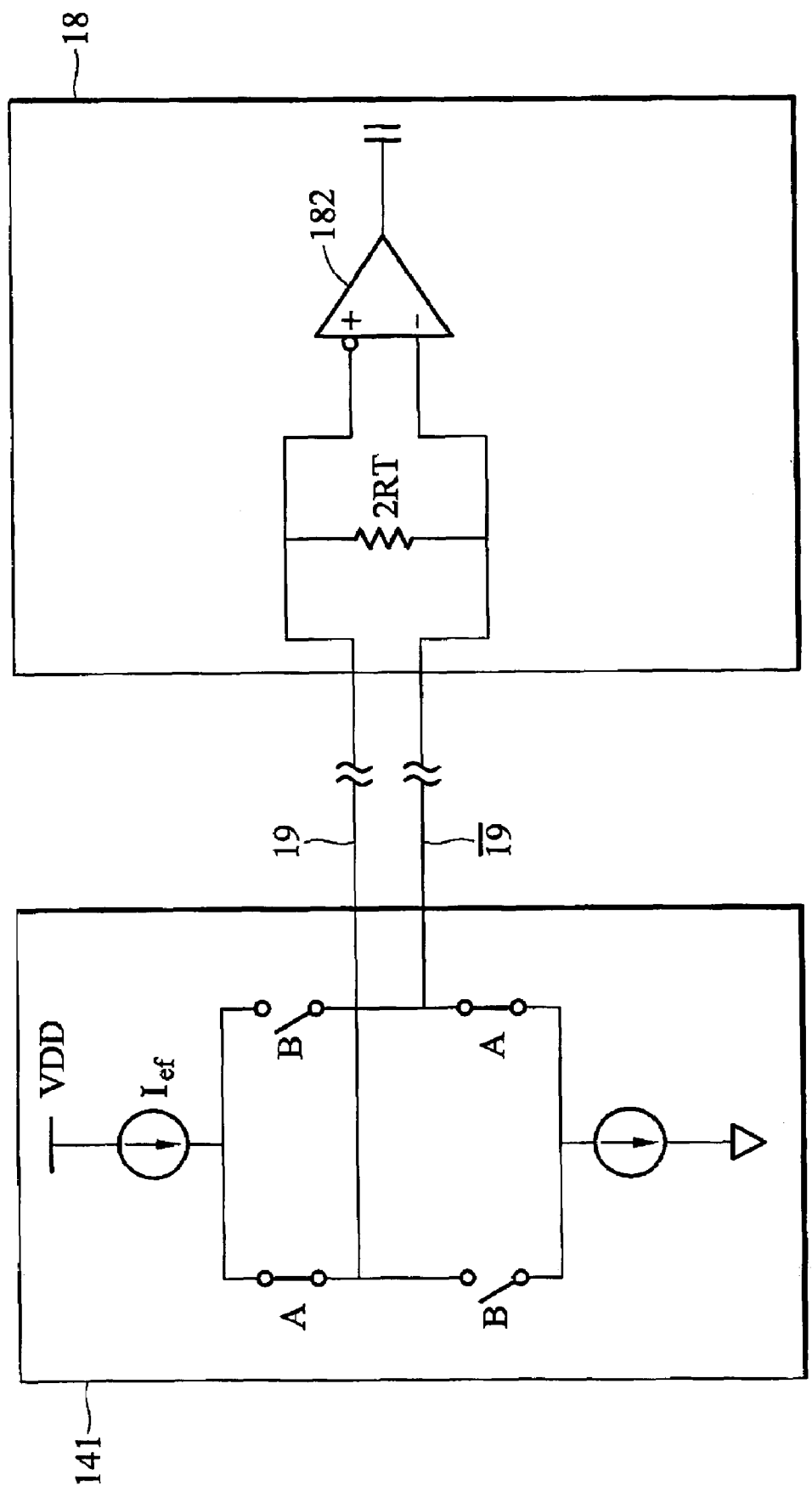
FIG. 1B is a diagram showing an output driver in LVDS transmitter and a corresponding input unit thereof.

In this embodiment, the first transmission unit 110 can be a LVDS transmitter as shown in FIGS. 1A and 1B. The first transmission unit 110 is coupled to the input terminals 51 to transmit first data, through the first signal lines YTX0+~YTX3+, YTX0-~YTX3-, YTCLK+ and YTCLK-, to a corresponding receiver (not shown). The first transmission unit 110 comprises a first serializer 112 coupled to the input terminals 51 to convert parallel data to serial data streams and a driving unit 114 coupled to the first serializer 112 to transmit the serial data streams to a corresponding receiver. The driving unit 114 has a plurality of first drivers D1~D5, which can be LVDS drivers. Each first drivers D1~D5 is capable of sending a first differential signal to a first external input unit of a corresponding receiver through a pair of first signal lines. Each first external input unit in the corresponding receiver has a first resistor coupled between the first signal lines. For example, the driver D1 can send differential signals continuously to a corresponding input unit of an external receiver through the pair of signal lines YTX0+ and YTX0-, and so on.

Figure 2A:
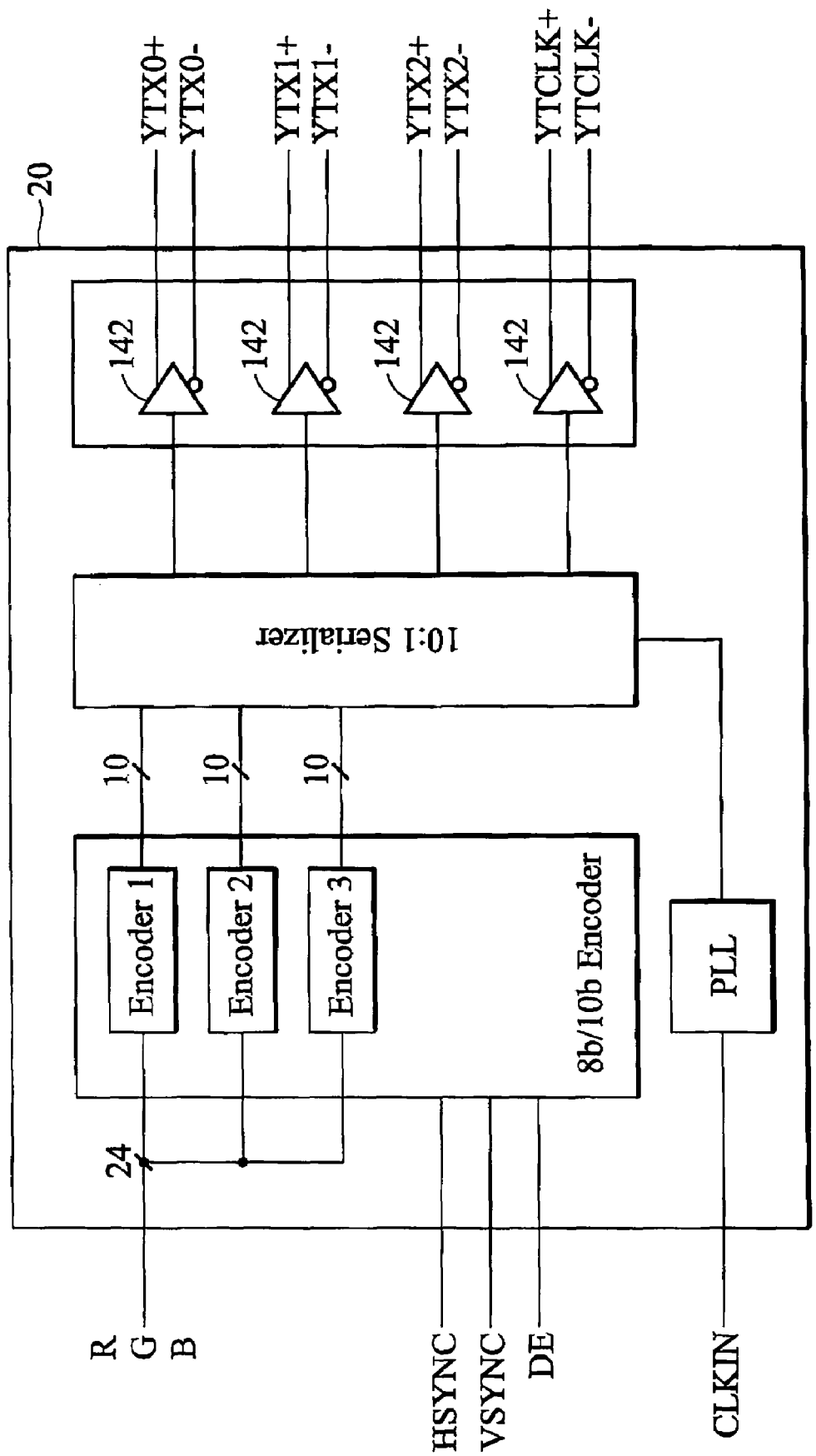
FIG. 2A shows a conventional TMDS transmitter.
Figure 2B:
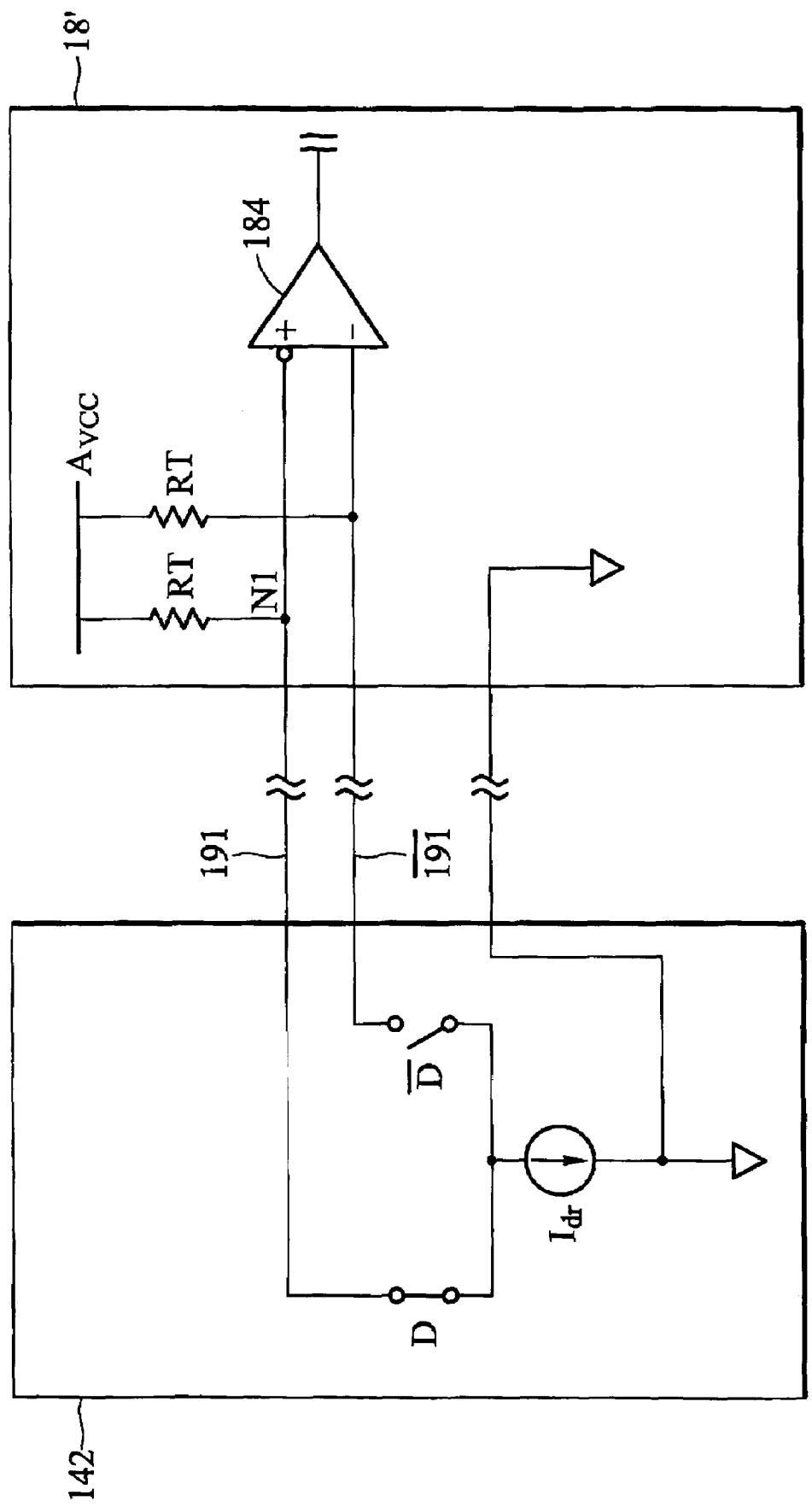
FIG. 2B is a diagram showing an output driver in TMDS transmitter and a corresponding input unit thereof.

In this embodiment, the second transmission unit 120 can be a TMDS transmitter as shown in FIGS. 2A and 2B. The second transmission unit 120 is coupled to the input terminals 51 to transmit the first data, through the second signal lines (ZTX0+~ZTX2+, ZTX0-~ZTX2-, ZTCLK+~ZTCLK-) to a corresponding receiver. The second transmission unit 120 comprises an encoding unit 122, a second serializer 124 and a driving unit 126. The encoding unit 122 is coupled to the input terminals 51 to encode the first data to second data. In this embodiment, the encoding unit 122 can be a 8 bit/10 bit encoding unit comprising three encoders to encode the first data to the second data. In the 8 bit/10 bit encoding unit, each 8 bits of data is encoded to 10 bits of data. The second serializer 124 is coupled to the encoding unit 122 to convert parallel data to serial data streams, and the driving unit 126 transmits the serial data streams from the serializer to a corresponding receiver.

The driving unit 126 has a plurality of second drivers D6~D9, which can be TMDS drivers. Each second drivers D6~D9 is capable of sending a second differential signal to a second external input unit through a pair of second signal lines. The second external input unit in the receiver has second resistors each coupled between a power rail in the second external input unit and one of the second signal lines. For example, the driver D6 can send differential signals continuously to a corresponding input unit of an external receiver through the pair of signal lines ZTX0+ and ZTX0-, and so on.

The switching controller 130 is coupled to the first transmission unit 110, the second transmission unit 120, the clock buffer 140 and the PLL 150. The switching controller 130 enables or disables the first transmission unit 110, the second transmission unit 120, the clock buffer 140 and the PLL 150 in different operation modes according to a mode selection signal MODSEL and a power down selection signal PD. The clock buffer 140 is coupled to an input clock CLKIN, the mode selection signal MODSEL and the switching controller 130, to generate internal clock signals CLK1~CLK3 for the first transmission unit 110, the second transmission unit 120 and the PLL 150 respectively.

Figure 4:
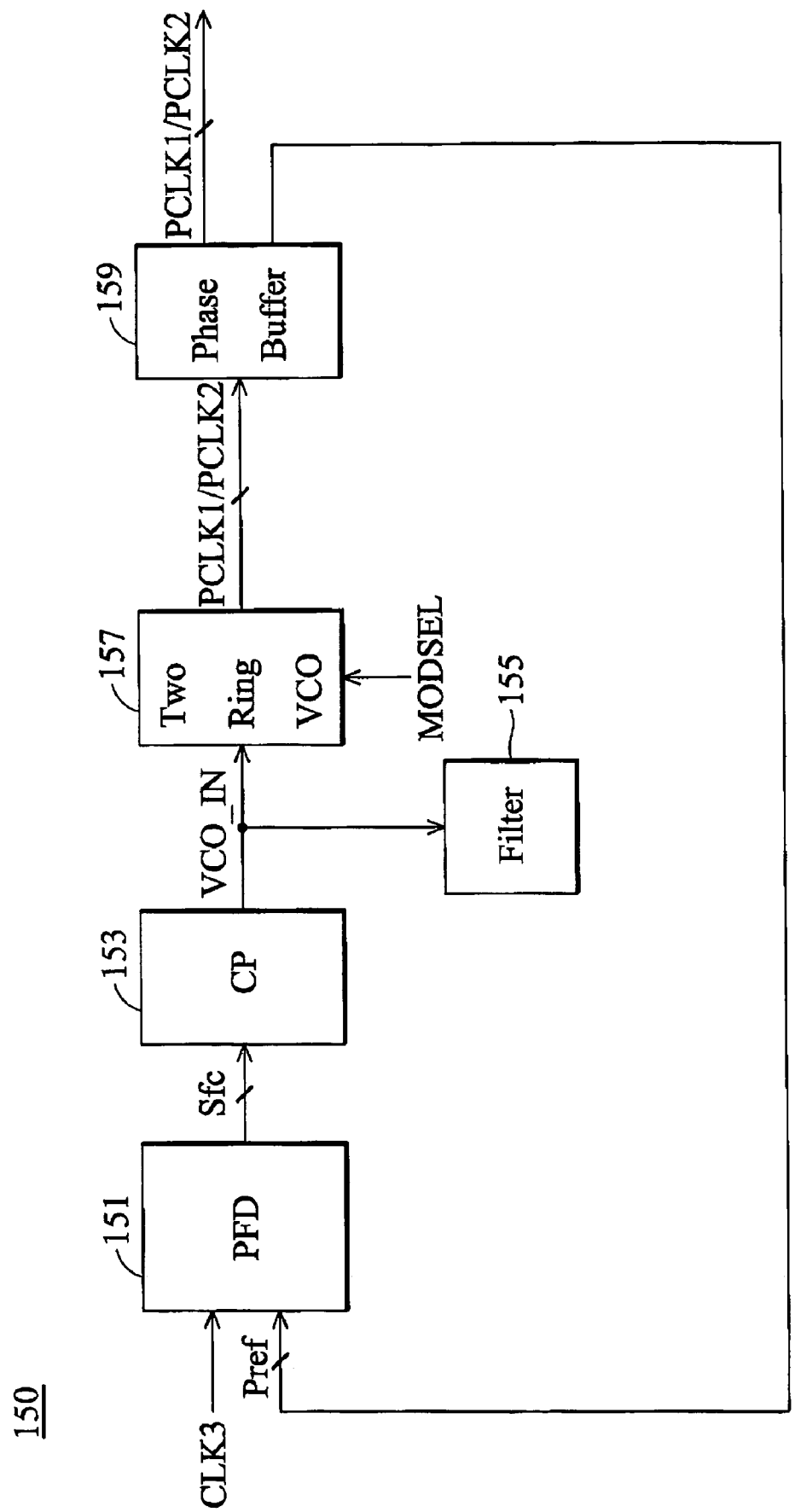
FIG. 4 is a block diagram of a phase locked loop in the combined transmission unit according to embodiments of the present invention.

The PLL 150 is coupled to the third clock signal CLK3 and the mode selection signal MODSEL to generate a first set of output clock signals PCLK1 to the first transmission unit 110 in LVDS mode and a second set of output clock signals PCLK2 to the second transmission unit 120 in TMDS mode. FIG. 4 shows a phase locked loop 150 according to embodiments of the present invention, wherein the third clock signal CLK3 can be identical to the input clock CLKIN.

As shown in FIG. 4, the PLL 150 comprises a phase frequency detector (PFD) 151, a charge pump 153, a low pass filter 155, a two-ring voltage controlled oscillator (VCO) 157 and a phase buffer 159.

The PFD 151 is coupled to clock buffer 140 to compare the third clock signal CLK3 with a feedback clock signal Pref and generate an error signal Sfc proportional to the phase/frequency difference between the third clock signal CLK3 and a feedback clock signal Pref. The error signal Sfc is output to the charge pump 153. The charge pump 153 is coupled to the error signal Sfc from the PFD 151 to generate a charge control signal VCO_IN by the low pass filter 155. Typically, the charge pump 153 can be charged or discharged by the error signal Sfc from the PFD 151 to output a current signal, and the filter 155 is coupled to the charge pump 153 to convert the current signal to the charge control signal VCO_IN.

The two-ring VCO 157 is coupled to the charge control signal VCO_IN and the mode selection signal MODSEL to generate the first set of output clock signals PCLK1 in the LVDS mode and the second set of output clock signals PCLK2 in TMDS mode. The optional phase buffer 159 is coupled to the two-ring VCO 157 to store the first set of clock signals PCLK1 or the second set of clock signals PCLK2 from the two-ring VCO 157. In embodiments of the present invention, one of the first clock signals PCLK1 is output to the PFD serving as the feedback clock signal Pref in LVDS mode, and one of the second clock signals PCLK2 is output to the PFD serving as the feedback clock signal Pref in TMDS mode.

Figure 5:
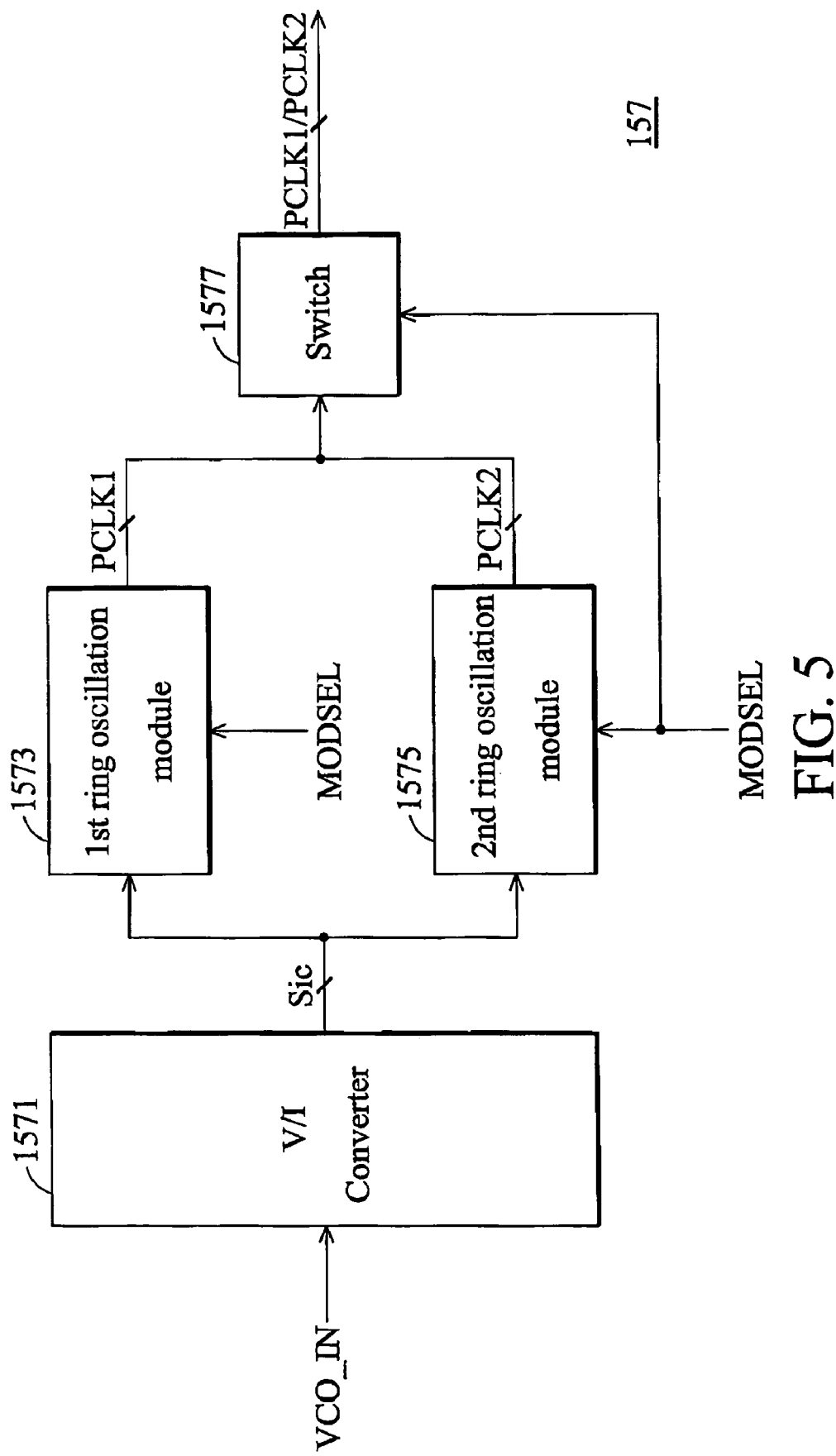
FIG. 5 is a block diagram of a two-ring voltage control oscillator in the phase locked loop according to embodiments of the present invention.

FIG. 5 shows a two-ring VCO 157 in the phase locked loop 150 according to embodiments of the present invention. As shown in FIG. 5, the two-ring VCO 157 comprises a voltage-to-current converter 1571, a first ring oscillation module 1573, a second ring oscillation module 1575 and a switch 1577.

The converter 1571 is coupled to the charge pump 153 and the low pass filter 155 to convert charge control signal to a current control signal Sic. The first ring oscillation module 1573 is enabled to generate the first set of output clock signals PCLK1 in the LVDS mode according to the current control signal Sic and the mode selection signal MODSEL. In embodiments of the present invention, the first ring oscillation module 1573 can be a 7-stage ring oscillator comprising seven delay cells connected in a loop. In LVDS mode, the first ring oscillation module 1573 is enabled to generate 14 clock signals with different phase as the first set of output clock signals PCLK1 for the first serializer 112 of the first transmission unit 110.

The second ring oscillation module 1575 is enabled to generate the second set of output clock signals PCLK2 in TMDS mode according to the current control signal Sic and the mode selection signal MODSEL. In embodiments of the present invention, the second ring oscillation module 1575 can be a 5-stage ring oscillator comprising five delay cells connected in a loop. In TMDS mode, the second ring oscillation module 1575 is enabled to generate 10 clock signals with different phase as the second set of output clock signals PCLK2 for the second serializer 124 of the second transmission unit 120. The switch 1577 is coupled to the first and second ring oscillation module 1573 and 1575 to output the first set of output clock signals PCLK1 in LVDS mode or the second set of output clock signals PCLK2 in TMDS mode according to mode selection signal MODSEL.

Operations of the combined transmitter 100 according to the first embodiment of the present invention are described as follows, with reference to FIG. 3A.

In LVDS mode (first mode), the mode selection signal MODSEL and the power selection signal PD are high and low respectively, such that the switching controller 130 disables the second transmitter 120 and enables the first transmission unit 110 to transmit the first data on the first terminals 51 to a corresponding external receiver. The clock buffer 140, according to the input clock CLKIN and the mode selection signal MODSEL, generates the first clock signal CLK1 and the third clock signal CLK3 to the first transmission unit 110 and the PLL respectively. The PLL 150, according to the third clock signal CLK3 and the mode selection signal MODSEL, generates the first set of output clock signals PCLK1 to the first transmission unit 110.

The first serializer 112 converts first data on the input terminals 51 and the first set output clock signal PCLK1 to serial data streams, and the driving unit 114 transmits the serial data streams to a corresponding external receiver through signal lines YTX0+~YTX3+, YTX0-~YTX3-, YTCLK+ and YTCLK-. In this mode, according to the mode selection signal MODSEL and the power selection signal PD, the second clock CLK2 and the second set output clock signal PCLK2 for the second transmission unit 120 are disabled, such that the encoding unit 122, the second serializer 124 and driving unit 126 in the second transmission 120 are disabled.

In TMDS mode (second mode), the mode selection signal MODSEL and the power selection signal PD are both low, such that the switching controller 130 disables the first transmitter 110 and enables the second transmission unit 120 to transmit the first data on the first terminals 51 to a corresponding external receiver. The clock buffer 140, according to the input clock CLKIN and the mode selection signal MODSEL, generates the second clock signal CLK2 and the third clock signal CLK3 to the second transmission unit 120 and the PLL respectively. The PLL 150, according to the third clock signal CLK3 and the mode selection signal MODSEL, generates the second set of output clock signals PCLK2 to the second transmission unit 120. The encoding unit 122 encodes the first data on the first input terminals 51 to second data, the second serializer 124 converts the second data and the second set of output clock signal PCLK2 to serial data streams, and the driving unit 126 transmits the serial data streams to a corresponding external receiver through the second signal lines ZTX0+~ZTX2+, ZTX0-~ZTX2-, ZTCLK+~ZTCLK-. In this mode, according to the mode selection signal MODSEL and the power selection signal PD, the first clock CLK1 and the first set of output clock signals PCLK1 for the first transmission unit 110 are disabled, such that the first serializer 112 and driving unit 124 in the first transmission 110 are disabled.

In the power down mode, the power selection signal PD is high, and the switching controller 130 powers down the first transmission unit 110, the second transmission unit 120, the clock buffer 140 and the PLL 150, regardless of the state of the mode selection signal MODSEL. Thus, the combined transmitter of the embodiment can transmit LVDS signals in LVDS mode and TMDS signals in TMDS mode by the mode selection signal. In this first embodiment, the first and second transmission units 110 and 120 share the first input terminals 51.

SECOND EMBODIMENT

Figure 3B:
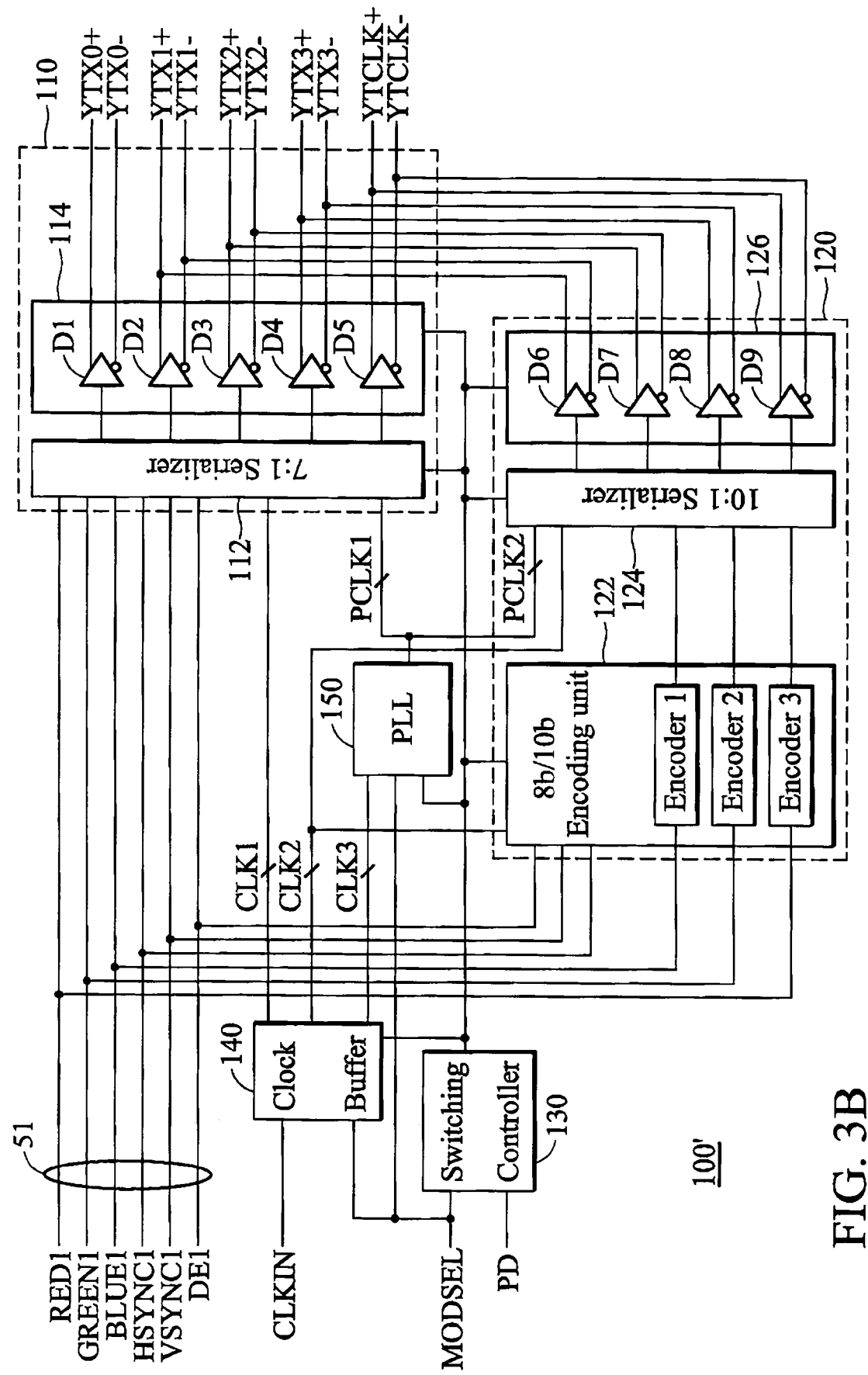
FIG. 3B shows another combined transmission unit according to a second embodiment of the present invention.

FIG. 3B is a schematic diagram of a combined transmitter capable of transmitting LVDS signals and TMDS signals according to a second embodiment of the present invention. As shown in FIG. 3B, the combined transmitter 100' comprises a first set of input terminals 51, a first transmitter 110, a second transmitter 120, a switching controller 130, a clock buffer 140 and a phase locked loop (PLL) 150.

The combined transmitter 100' is similar to that shown in FIG. 3A except for the driving unit 126. For brevity, description of like structures is omitted. In this embodiment, the drivers D6~D9 are coupled to the signal lines YTX1+~YTX3+, YTX1-~YTX3-, YTCLK+ and YTCLK- coupled to the driving unit 114 in the first transmission unit 110, rather than the signal lines ZTX0+~ZTX2+, ZTX0-~ZTX2-, ZTCLK+~ZTCLK- as shown in FIG. 3A. In this embodiment, the first and second transmission units 110 and 120 share the input terminals 51 and the output terminals, such as the signal lines YTX1+~YTX3+, YTX1-~YTX3-, YTCLK+~YTCLK-.

In LVDS mode (first mode), the mode selection signal MODSEL and the power selection signal PD are high and low respectively, such that the switching controller 130 disables the second transmitter 120 and enables the first transmission unit 110 to transmit the first data on the first terminals 51 to a corresponding external receiver. The clock buffer 140, according to the input clock CLKIN and the mode selection signal MODSEL, generates the first clock signal CLK1 and the third clock signal CLK3 to the first transmission unit 110 and the PLL respectively. The PLL 150, according to the third clock signal CLK3 and the mode selection signal MODSEL, generates the first set of output clock signal PCLK1 to the first transmission unit 110.

The first serializer 112 converts first data on the input terminals 51 and the first set output clock signals PCLK1 to serial data streams, and the driving unit 114 transmits the serial data streams to a corresponding external receiver through signal lines YTX0+~YTX3+, YTX0-~YTX3-, YTCLK+ and YTCLK-. In this mode, according to the mode selection signal MODSEL and the power selection signal PD, the second clock CLK2 and the second set output clock signals PCLK2 for the second transmission unit 120 are disabled, such that the encoding unit 122, the second serializer 124 and driving unit 126 in the second transmission 120 are all disabled.

In TMDS mode (second mode), the mode selection signal MODSEL and the power selection signal PD are both low respectively, such that the switching controller 130 disables the first transmitter 110 and enables the second transmission unit 120 to transmit the first data on the first terminals 51 to a corresponding external receiver (not shown). The clock buffer 140, according to the input clock CLKIN and the mode selection signal MODSEL, generates the second clock signal CLK2 and the third clock signal CLK3 to the second transmission unit 120 and the PLL respectively. The PLL 150, according to the third clock signal CLK3 and the mode selection signal MODSEL, generates the second set of output clock signals PCLK2 to the second transmission unit 120. The encoding unit 122 encodes the first data on the first input terminals 51 to second data, the second serializer 124 converts the second data and the second set of output clock signals PCLK2 to serial data streams, and the driving unit 126 transmits the serial data streams to a corresponding external receiver through the first signal lines YTX1+ ~YTX3+, YTX1-~YTX3-, YTCLK+~YTCLK-. In this mode, according to the mode selection signal MODSEL and the power selection signal PD, the first clock CLK1 and the first set of output clock signals PCLK1 for the first transmission unit 110 are disabled, such that the first serializer 112 and driving unit 114 in the first transmission 110 are disabled.

In the power down mode, the power selection signal PD is high, and the switching controller 130 powers down the first transmission unit 110, the second transmission unit 120, the clock buffer 140 and the PLL 150, regardless of the state of the mode selection signal MODSEL. Thus, the combined transmitter of the embodiment can transmit LVDS signals in LVDS mode and TMDS signals in TMDS mode by the mode selection signal.

THIRD EMBODIMENT

Figure 3C:
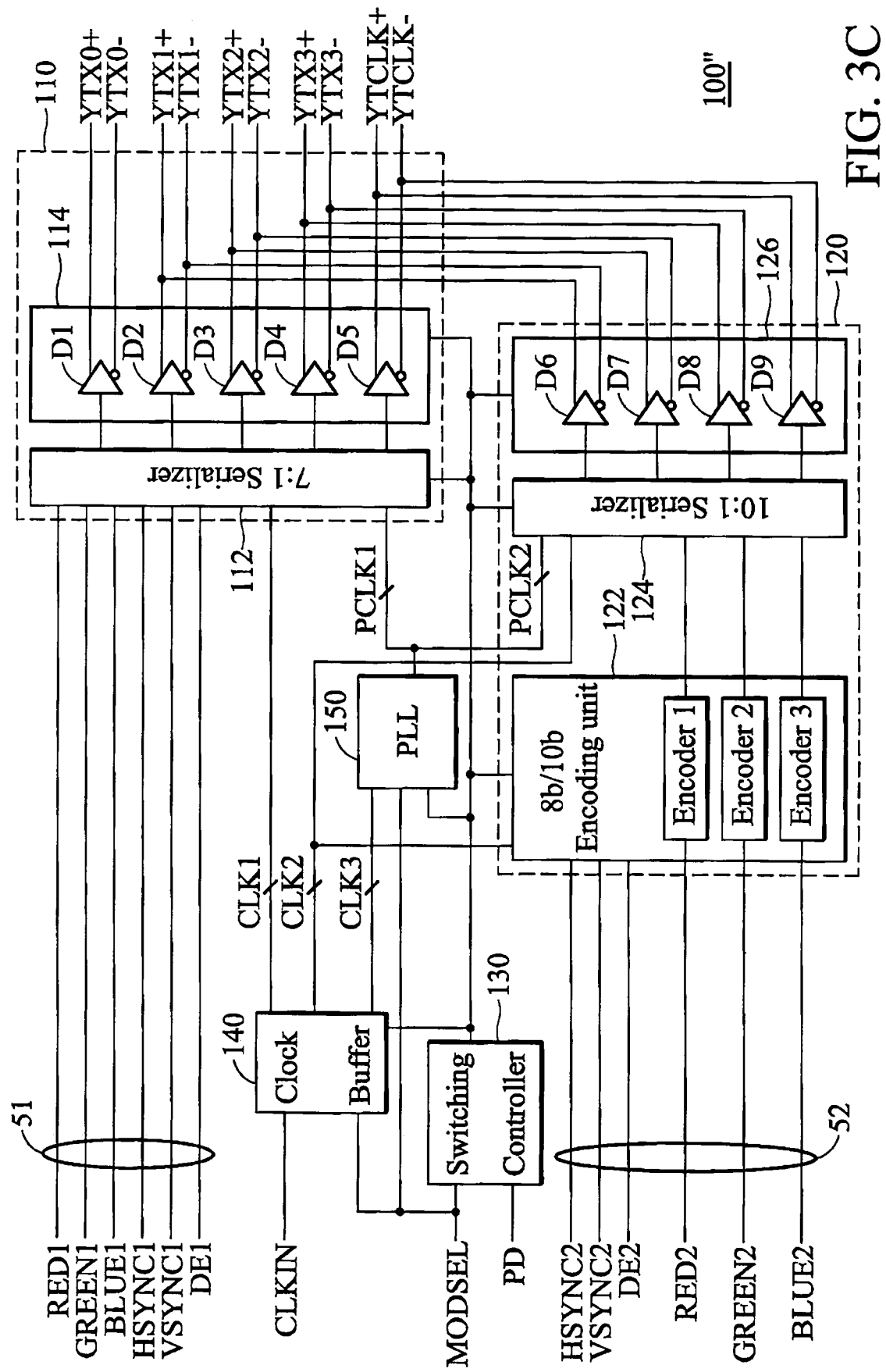
FIG. 3C shows another combined transmission unit according to a third embodiment of the present invention.

FIG. 3C is a schematic diagram of a combined transmitter capable of transmitting LVDS signals and TMDS signals according to a third embodiment of the present invention. As shown in FIG. 3C, the combined transmitter 100" comprises a first set of input terminals 51, a second set of input terminals 52, a first transmitter 110, a second transmitter 120, a switching controller 130, a clock buffer 140 and a phase locked loop (PLL) 150.

The combined transmitter 100" is similar to that in FIG. 3A except for the encoding unit 122 and the driving unit 126. For brevity, description of like structures is omitted. In this embodiment, the second set of input terminals 52 receives second data comprising video and sync information RED2, GREEN2, BULE2, HSYNC2, VSYNC2 and DE2. The encoding unit 122 in second transmission unit 120 is coupled to the second set input terminals 52, rather than the first set of input terminals 51 as shown in FIG. 3A. Further, the drivers D6~D9 in the second driving unit 126 are coupled to the signal lines YTX1+~YTX3+, YTX1-~YTX3-, YTCLK+ and YTCLK- coupled to the driving unit 114 in the first transmission unit 110, rather than the signal lines ZTX0+~ZTX2+, ZTX0-~ZTX2-, ZTCLK+~ZTCLK- as shown in FIG. 3A. In this embodiment, the first and second transmission units 110 and 120 share as the output terminals, such as the signal lines YTX1+~YTX3+, YTX1-~YTX3-, YTCLK+~YTCLK-.

In LVDS mode (first mode), the mode selection signal MODSEL and the power selection signal PD are high and low respectively, such that the switching controller 130 disables the second transmitter 120 and enables the first transmission unit 110 to transmit the first data on the first terminals 51 to a corresponding external receiver. The clock buffer 140, according to the input clock CLKIN and the mode selection signal MODSEL, generates the first clock signal CLK1 and the third clock signal CLK3 to the first transmission unit 110 and the PLL respectively. The PLL 150, according to the third clock signal CLK3 and the mode selection signal MODSEL, generates the first set of output clock signals PCLK1 to the first transmission unit 110. The first serializer 112 converts first data on the input terminals 51 and the first set output clock signal PCLK1 to serial data streams, and the driving unit 114 transmits the serial data streams to a corresponding external receiver through signal lines YTX0+~YTX3+, YTX0-~YTX3-, YTCLK+ and YTCLK-. In this mode, according to the mode selection signal MODSEL and the power selection signal PD, the second clock CLK2 and the second set output clock signals PCLK2 for the second transmission unit 120 are disabled, such that the encoding unit 122, the second serializer 124 and driving unit 126 in the second transmission 120 are all disabled.

In TMDS mode (second mode), the mode selection signal MODSEL and the power selection signal PD are both low respectively, such that the switching controller 130 disables the first transmitter 110 and enables the first transmission unit 120 to transmit the second data on the second terminals 52 to a corresponding external receiver (not shown). The clock buffer 140, according to the input clock CLKIN and the mode selection signal MODSEL, generates the second clock signal CLK2 and the third clock signal CLK3 to the second transmission unit 120 and the PLL respectively. The PLL 150, according to the third clock signal CLK3 and the mode selection signal MODSEL, generates the second set of output clock signals PCLK2 to the second transmission unit 120. The encoding unit 122 encodes the second data on the second input terminals 52 to third data, the second serializer 124 converts the third data and the second set of output clock signal PCLK2 to serial data streams, and the driving unit 126 transmits the serial data streams to a corresponding external receiver through the first signal lines YTX1+~YTX3+, YTX1-~YTX3-, YTCLK+~YTCLK-. In this mode, according to the mode selection signal MODSEL and the power selection signal PD, the first clock CLK1 and the first set output clock signal PCLK1 for the first transmission unit 110 are disabled, such that the first serializer 112 and driving unit 114 in the first transmission 110 are disabled.

In the power down mode, the power selection signal PD is high, and the switching controller 130 powers down the first transmission unit 110, the second transmission unit 120, the clock buffer 140 and the PLL 150, regardless of the state of the mode selection signal MODSEL. Thus, the combined transmitter of the embodiment can transmit LVDS signals in LVDS mode and TMDS signals in TMDS mode by the mode selection signal.

There are differences between output drivers in the LVDS transmission unit and output drivers in the TMDS transmission unit. For example, no reference voltage is required at corresponding receivers for output drivers in the LVDS transmission unit, and the common mode voltage (Vcm) determined by the LVDS transmission unit is typically 1.25V. A stable reference voltage Avcc is required at corresponding receivers for output drivers in the TMDS transmission unit, the stable reference voltage Avcc is typically 3.3V and the common mode voltage is 3V. Moreover, the output differential voltage swing of the output drivers in the LVDS transmission unit is from 250 mV to 450 mV around common mode voltage Vcm. The output differential voltage swing of the output drivers in the TMDS transmission unit is from 400 mV to 600 mV. Different common mode voltages, however, generate incompatibility when the LVDS and TMDS transmission units directly share the output terminals without modifying structures of the LVDS and TMDS output drivers. This problem is described as follows.

Figure 6:
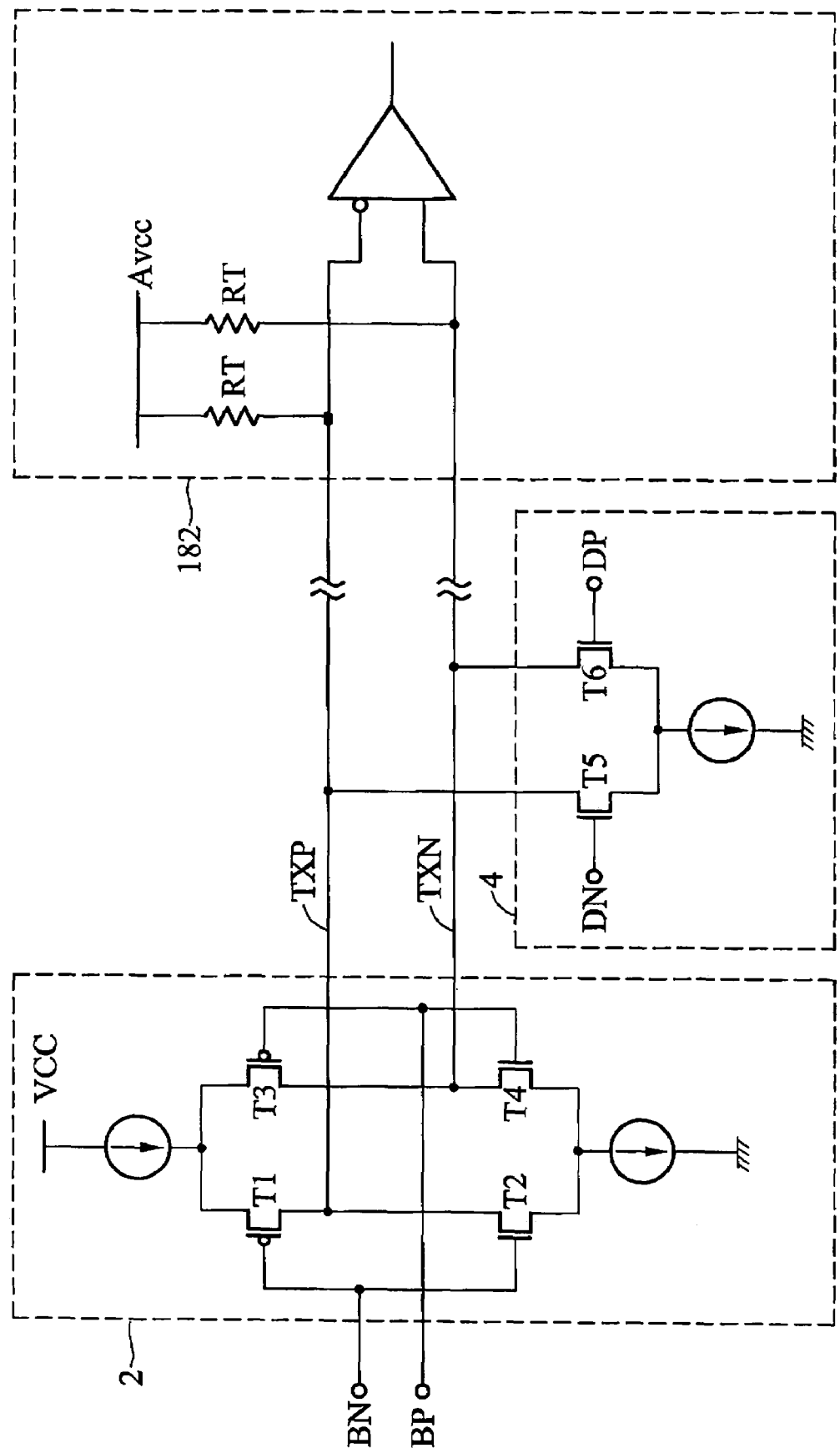
FIG. 6 shows a conventional LVDS driver and a conventional TMDS driver sharing a pair of output terminals.

FIG. 6 shows a conventional LVDS driver and a conventional TMDS driver share a pair of output terminals. As shown, the power source VCC in the LVDS driver 2 is typically 2.5V. Avcc, the power supply in input unit 182 of the external receiver, is typically 3.3V. In TMDS mode, the LVDS driver 2 is disabled and the TMDS driver 4 enabled, signals BP and BN are both high (2.5V), and one of the signal lines TXP and TXN is pulled down to 2.7V from 3.3V according to the signals DN and DP. The voltages on the signal lines TXP and TXN, however, are higher than those on terminals BN and BP and power source VCC in the LVDS driver. Thus, leakage current may flow to the power source VCC in the LVDS driver 2 through the PMOS transistors T1 and T3, decreasing the output differential swing of the TMDS driver 4. Further, if MOS transistors T1~T6 are all 2.5V devices, device breakdown may occur due to the voltages on the signal lines TXP and TXN.

Figure 7:
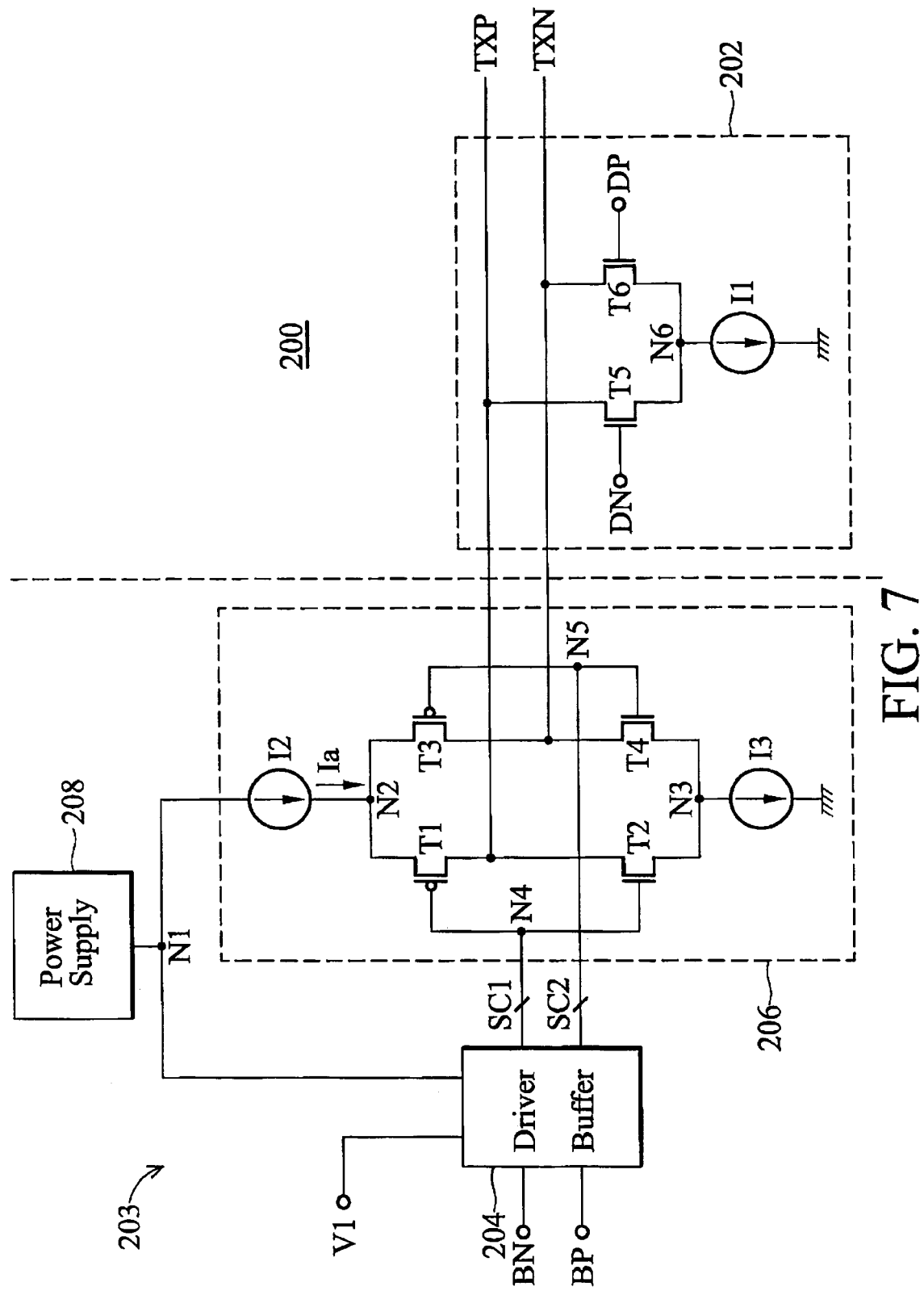
FIG. 7 shows a combined driver according to embodiments of the present invention.

To address the problems caused by leakage current, embodiments of the present invention provide a combined driver 200 for the combined transmitter sharing output terminals to transmit LVDS signals and TMDS signals, such as the combined transmitter 100' and 100" shown in FIGS. 3B and 3C. FIG. 7 shows a combined output driver for the combined transmitter transmitting LVDS signals and TMDS signals through shared output terminals. In embodiments of the present invention, the second transmission unit is disabled by the switching controller, and the first transmission unit is enabled to transmit data to a corresponding receiver in LVDS mode. For example, the output drivers D6~D9 in the second transmission unit 120 can be disabled by control signals generated by the switching controller. In TMDS mode, the first transmission unit is disabled by the switching controller. For example, the output drivers D1~D5 in the first transmission unit 110 can be disabled by control signals generated by the switching controller.

As shown in FIG. 7, the combined output driver 200 comprises two output drivers 202 and 203. According to embodiments of the present invention, the output driver 203 shows the structure of each output driver (D1, D2, D3, D4 or D5) in the first transmission unit 110, and the output driver 202 shows the structure of each output driver (D6, D7, D8, or D9) in the second transmission unit 120. For example, the output driver 202, the signals lines TXP and TXN and the output driver 203 can be regarded as the output driver D6, the lines YTX1+ and YTX− and output driver D2 as shown in FIGS. 3B and 3C respectively.

The output driver 202 is coupled to a pair of signal lines TXP and TXN to output a differential signal to a corresponding external input unit (not shown) through signal lines TXP and TXN according to input signals DN and DP in TMDS mode. Since the second transmission unit 120 is a TMDS transmission unit, the output driver 202 can be a TMDS driver. As shown in FIG. 7, the output driver 202 comprises a differential pair composed of transistors T5 and T6 and a current source.

The output driver 203 is able to output a differential signal to a corresponding external input unit (not shown) through the pair of signal lines TXP and TXN according to input signals BN and BP in LVDS mode. The output driver 203 comprises a driver buffer 204, an output unit 206 and a power supply 208.

The driver buffer 204 comprises first and second power terminals coupled to a first voltage V1 and the first node N1 respectively, to generate two control signals SC1 and SC2 according to input signals BN and BP. The output unit 206 is coupled between the first node N1 and a first power rail (GND) to output the differential signal to the corresponding external input unit (not shown) through signal lines TXP and TXN according to the control signals SC1 and SC2. The power supply 208 provides different voltages to the first node N1 in LVDS mode and TMDS mode. In LVDS mode, the power supply 208 provides the first voltage, such as 2.5V, to the driver buffer 204 and the output unit 206. In TMDS mode, the power supply 208 provides the second voltage, such as 3.3V, to the driver buffer 204 and the output unit 206.

In LVDS mode, the first (LVDS) transmission unit 110 is able to transmit data and the second (TMDS) transmission unit 120 is disabled. Thus, the output drivers D1~D5 first (LVDS) in transmission unit 110 are enabled to output differential signals to corresponding external input units of a receiver, while all drivers D6~D9 in the second transmission unit 120 are disabled. As the output driver 202 represents the drivers D6~D9 in second transmission unit 120 and the output driver 203 represents the output drivers D1~D5, the output driver 202 is disabled and the output driver 203 is enabled in LVDS mode.

Therefore, in the output driver 202, gates of the transistors T5 and T6 are pulled low and the current source I1 is disabled. The power supply 208 provides the voltage V1 (2.5V) to the driver buffer 204 and output unit 206 through first node N1. Because the voltages on the first and second power terminals are both voltage V1 in this mode, the driver buffer 204 outputs two control signals SC1 and SC2 according to the input signals BN and BP, and the first voltage V1. The output unit 206 generates a differential signal to a corresponding external input unit through the signal lines TXP and TXN according to the control signals SC1 and SC2. For example, if the control signals SC1 and SC2 are low and high respectively, transistor T1 and T4 are turned on and transistors T2 and T3 are turned off, such that current Ia flows to the corresponding external input unit through the transistor T1, the signal line TXP and flows back through the signal line TXN, thereby creating a differential voltage at the input terminals of the corresponding external input unit, and vice versa.

In TMDS mode, the first (LVDS) transmission unit 110 is disabled and the second (TMDS) transmission unit 120 is enabled to transmit data. Thus, the output drivers D6~D9 in transmission unit 120 are able to output differential signals to corresponding external input units of a receiver, while all drivers D1~D5 in the first transmission unit 110 are disabled. As the output driver 202 represents the drives D6~D9 in second transmission unit 120 and the output driver 203 represents the output drivers D1~D5, the output driver 203 is disabled and the output driver 202 is enabled in TMDS mode.

Thus, the output driver 202 outputs a differential signal to the corresponding external input unit of a receiver according to the input signals DN and DP. For example, if signals DP and DN are high and low, the signal line TXN is pulled down to 2.7 and the signal line TXP maintained at 3.3V, thereby creating a differential voltage at the input terminals of the corresponding external input unit, and vice versa. In TMDS mode, the power supply 208 provides the second voltage of 3.3V to the driver buffer 204 and output unit 206 through the first node N1. Because the voltages on the first and second power terminals of the clock buffer are 2.5V and 3.3V respectively in this mode, the driver buffer 204 outputs two control signals SC1 and SC2 of 3.3V according to the input signals BN and BP, the first voltage V1 and the second voltage of 3.3V provided by the power supply 208. The output unit 206 is disabled according to the control signals SC1 and SC2, and the current source I2 and I3 are disabled also.

Because the second voltage (at node N1) provided by the power supply 208 and the control signals SC1 and SC2 is 3.3V, the leakage current caused by the voltages (2.7V~3.3V) on the signal lines TXP and TXN is prevented. Consequently, there is no leakage current from signal lines TXP and TXN through transistor T1 and T3 to the power supply 208 in TMDS mode, and thus, the output differential swing of the output driver 202 is maintained.

Figure 8:
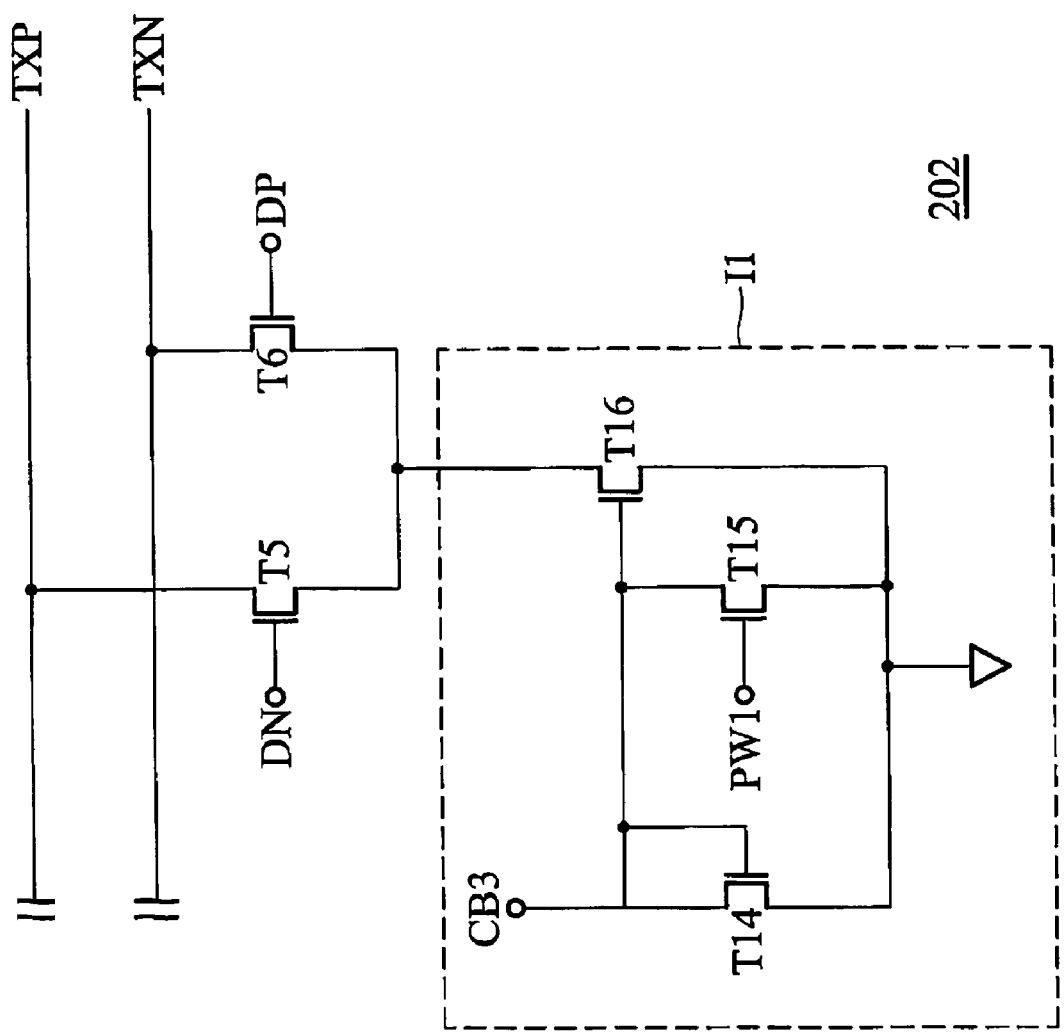
FIG. 8 shows a first output driver in the combined driver according to embodiments of the present invention.

FIG. 8 shows a first output driver of the combined output driver according to embodiments of the present invention. As shown, the output driver 202 is coupled between a pair of signal lines TXP and TXN and the first power rail (GND). The output driver 202 is enabled in TMDS mode to output a differential signal to the external input unit of a receiver (not shown) through the signal lines TXP and TXN. The output driver 202 comprises a differential pair comprising transistors T5 and T6 and a current source I1. The current source I1 comprises the transistors T14~T16, the drain terminal of the transistor T14 is coupled to a bias current CB3, and the control terminal of the transistor T15 is controlled by a control signal PW1. For example, in TMDS mode, if the signal DP and DN are high and low, the transistors T5 and T6 are turned off and on respectively, such that the signal line TXN is pulled down to 2.7 and the signal line TXP is maintained at 3.3V, thereby creating a differential voltage at the input terminals of the corresponding external input unit, and vice versa. In LVDS mode, the control terminals of the transistors T5 and T6 are pulled low by the signals DN and DP, and the current source I1 is disabled by the control signal PWD1.

Figure 9:
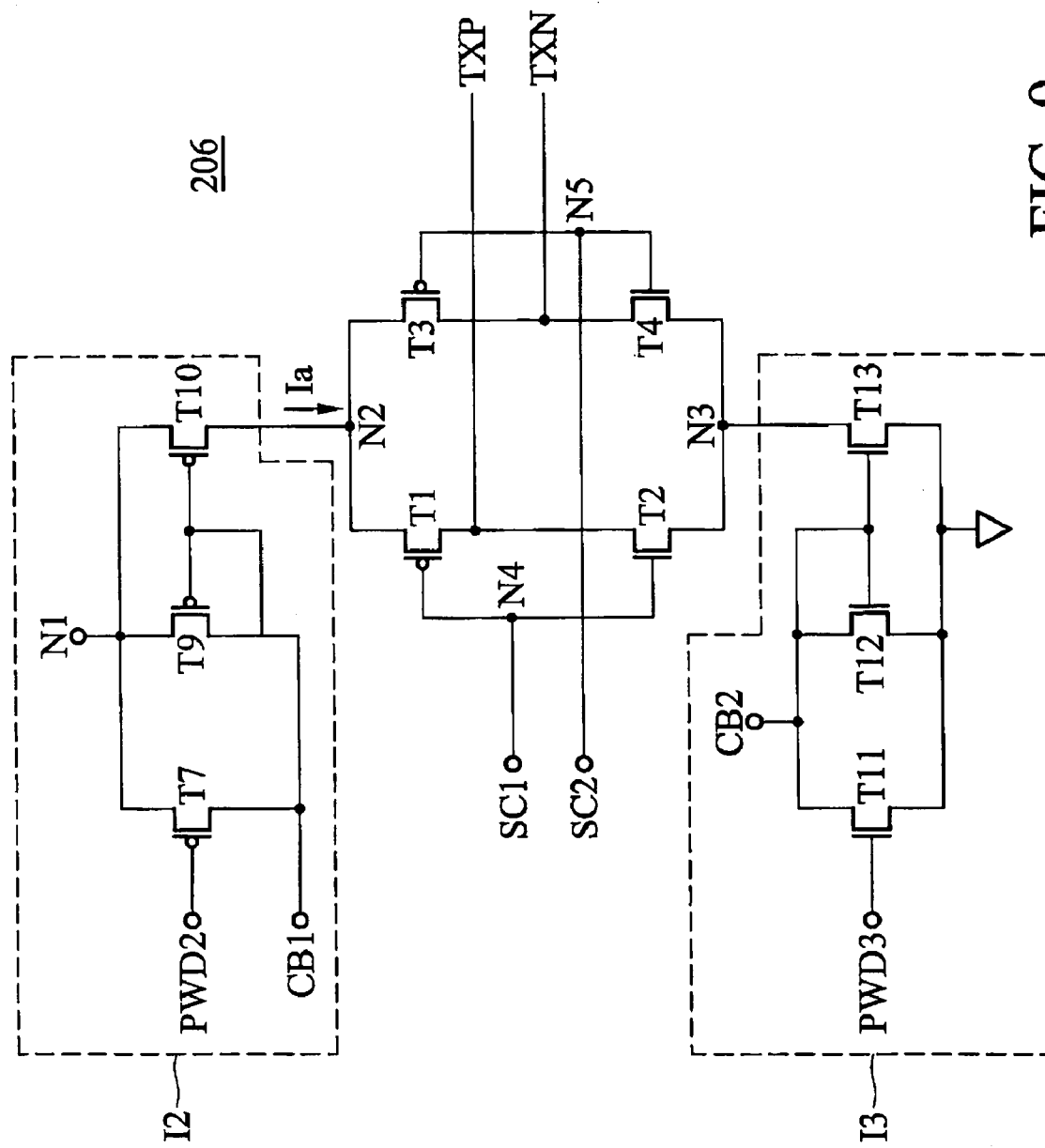
FIG. 9 shows an output unit in the combined driver according to embodiments of the present invention.

FIG. 9 shows an output unit of the combined output driver according to embodiments of the present invention. As shown, the output unit 206 in the output driver 203 is coupled between a first node N1 and the first power rail (GND). The output unit 206 is able to output a differential signal to the external input unit of a receiver (not shown) through the signal lines TXP and TXN according to control signals from the driving buffer 204 in LVDS mode. The output driver 206 comprises a latch unit comprising transistors T1~T4 and two current sources I2 and I3.

The current source I2 comprises transistors T7~T10 and is coupled between the nodes N1 and N2. The drain of the transistor T7 is coupled to a bias current CB1, and the current source I2 is controlled by a control signal PWD2. In TMDS mode, the transistor T7 is turned on to disable the source current I2 by the control signal PWD2.

In the latch unit, the control terminals of the transistors T1 and T2 are coupled to the control signal SC1, and the control terminals of the transistors T3 and T4 are coupled to the control signal SC2. The latch unit generates a differential signal on the signal lines TXP and TXN in the LVDS mode, and is disabled by the control signals SC1 and SC2 of 3.3V from driver buffer 204.

The current source I3 is coupled between the node N3 and the first power rail (GND) and comprises the transistors T11~T13. The control terminals of the transistors T12 and T13 and the drain terminals of the transistors T11 and T12 are coupled to a bias current CB2. In TMDS mode, the transistor T11 is turned off to disable the source current I3 by the control signal PWD3.

For example, in LVDS mode, if the control signals SC1 and SC2 are low and high respectively, transistor T1 and T4 are turned on and transistor T2 and T3 are turned off, such that current Ia flows to the corresponding external input unit through the transistor T1, the signal line TXP and flows back through the signal line TXN, thereby creating a differential voltage at the input terminals of the corresponding external input unit, and vice versa. In TMDS mode, the control terminals of the transistors T1~T4 are pulled high by the signals SC1 and SC2 of 3.3V, and the current sources I2 and I3 are disabled by the control signals PWD2 and PWD3. Because the voltages at nodes N1, N4 and N5 are 3.3V, the leakage current caused by the voltages on the signal lines TXP and TXN is prevented. Consequently, there is no leakage current flowing from signal lines TXP and TXN through transistor T1 and T3 to the power supply 208 in TMDS mode, and thus, the output differential swing of the output driver 202 is maintained.

Figure 10:
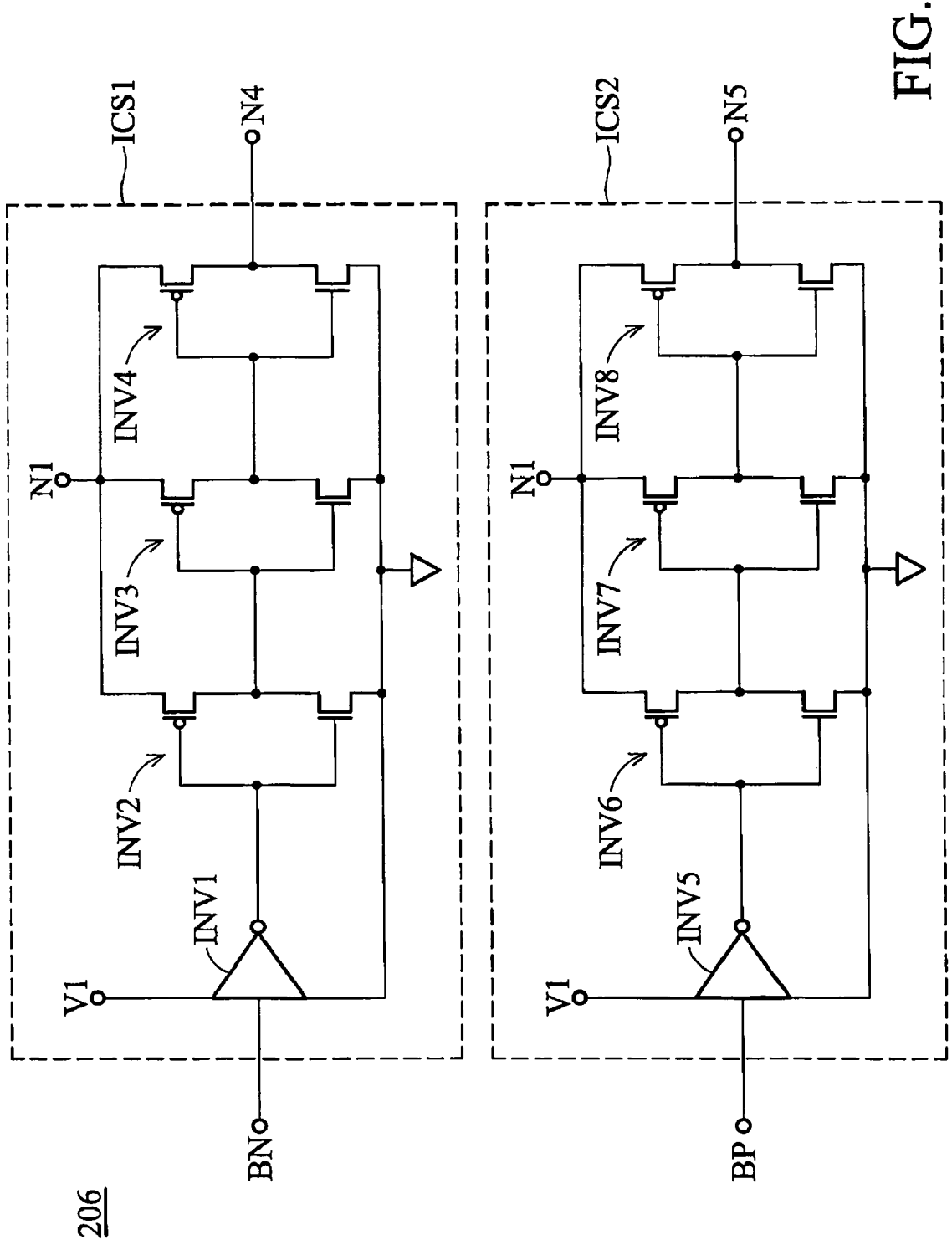
FIG. 10 shows a driver buffer in the combined driver according to embodiments of the present invention.

FIG. 10 shows a driver buffer of the combined output driver according to embodiments of the present invention.

The driver buffer 204 receives the input signals BN and BP and converts to two control signals SC1 and SC2 output to the nodes N4 and N5 in the output unit 206 respectively. The driver buffer comprises first and second inverter chains ICS1 and ICS2 to output the control signals SC1 and SC2 to the latch unit according to the input signals BN and BP, the first voltage V1, such as 2.5V, on the first power terminal and the voltage at the node N1. The voltage at the node N1 is provided by the power supply 208, wherein the power supply 208 provides a voltage of 2.5V to the node in LVDS mode and provides a voltage of 3.3V in TMDS mode.

The first inverter chain ICS1 has four inverters INV1~INV4 connected in series and the inverter INV1 is powered by the voltage V1 of 2.5V, the inverters INV2~INV4 are powered by the voltage at the node N1 provided by the power supply 208. The second inverter chain ICS2 has four inverters INV5~INV8 connected in series, with the inverter INV5 is powered by the voltage V1 of 2.5V, and the inverters INV6~INV8 powered by voltage at the node N1 provided by the power supply 208. The inverters INV1 and INV5 receive the input signal BN and BP respectively and the inverters INV4 and INV8 output control signals SC1 and SC2, respectively, to the nodes N4 and N5 in the output unit 206. In LVDS mode, because voltage V1 and voltage at the node N1 are both 2.5V, the two inverter chains ICS1 and ICS2 output the control signals SC1 and SC2 according to input signal BN and BP. At this time, one of control signals SC1 and SC2 is 2.5V and the other is 0V. In TMDS mode, the input signals BN and BP are designed to be 2.5V, the two inverter chains ICS1 and ICS2 output two control signals SC1 and SC2 of 3.3V to the output unit 206 due to the voltage of 3.3V at the node N1. In embodiments of the present invention, the number of each inverter chains ICS1 and ICS2 must be even, the first stage inverters INV1 and INV5 can be 2.5V devices, and the remaining inverters INV2~INV4 and INV6~INV8 can be 3.3V devices.

Figure 11:
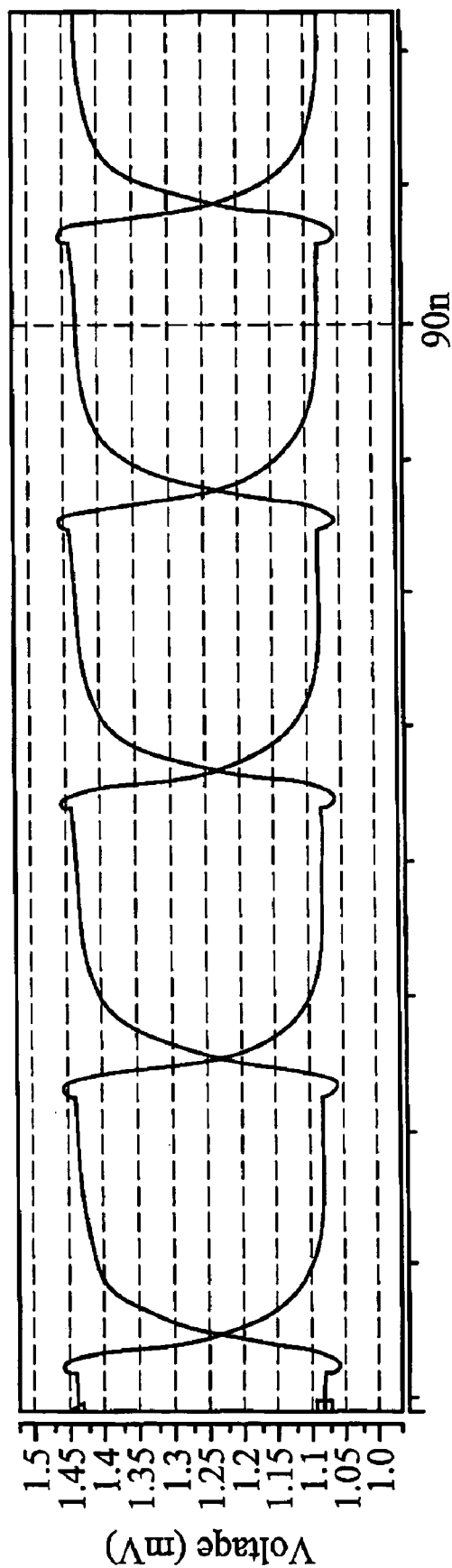
FIG. 11 is a wave diagram of output from the combined driver in LVDS mode according to embodiments of the present invention.
Figure 12:
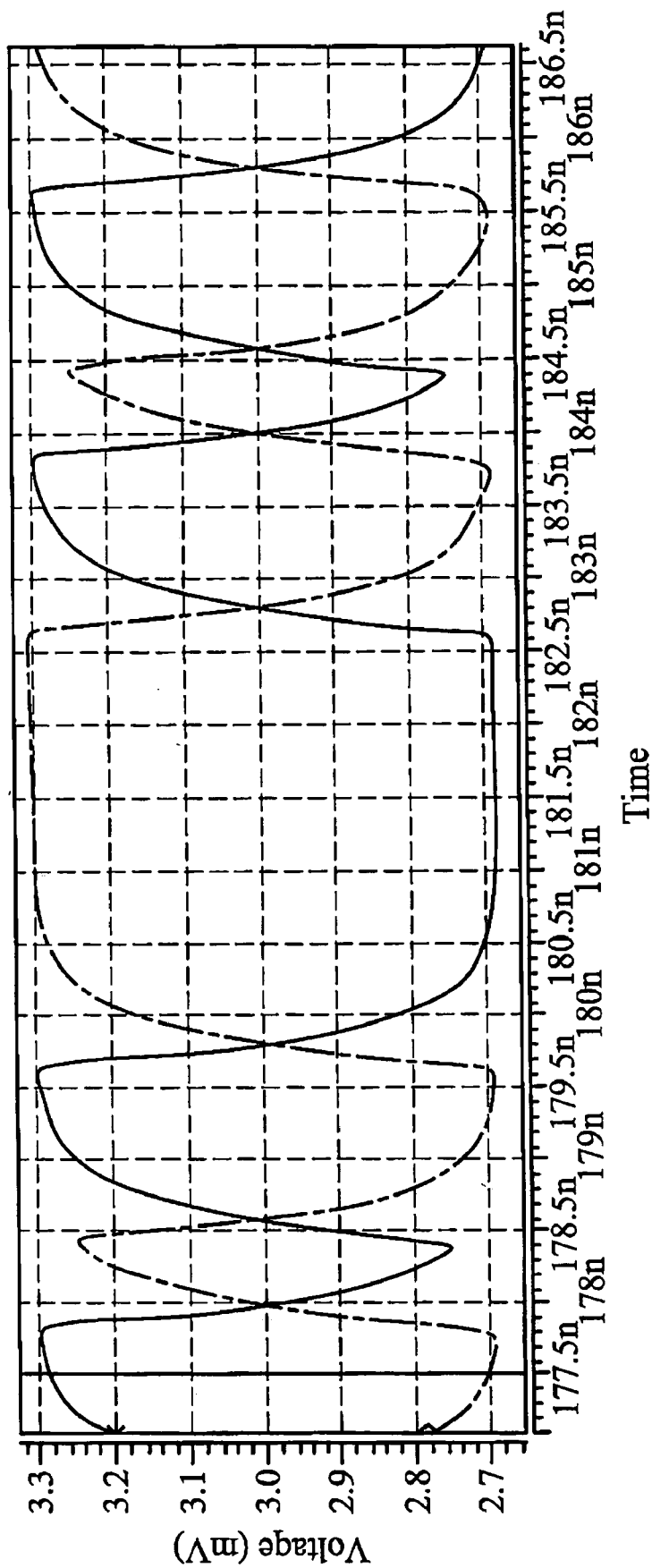
FIG. 12 is a wave diagram of output from the combined driver in TMDS mode according to embodiments of the present invention.

FIG. 11 is a wave diagram of output from the combined driver in LVDS mode according to embodiments of the present invention. As shown, 366 mV differential swing is reached and the common voltage is strictly constrained to 1.25V in LVDS mode. FIG. 12 is a wave diagram of output from the combined driver in TMDS mode according to embodiments of the present invention. As shown, 600 mV differential swing is reached and the common voltage is strictly constrained to 3V in TMDS mode. Thus, the combined transmitter of the embodiment can transmit LVDS signals in LVDS mode and TMDS signals in TMDS mode by mode selection signal. Furthermore, leakage current flowing from signal lines TXP and TXN through transistors T1 and T3 to the power supply 208 in TMDS mode is prevented, and thus, the output differential swing of the output driver 202 is maintained.

While the invention has been described by way of example and in terms of the preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A combined transmitter for transmitting video signals, comprising:
    a set of input terminal for receiving first data;
    a first transmission unit, coupled to the set of input terminals, comprising a plurality of first drivers each capable of sending a first differential signal to a first external input unit through a pair of first signal lines, wherein the first external input unit comprises a first resistor coupled between the first signal lines;
    a second transmission unit, coupled to the first set of input terminals, comprising a plurality of second drivers each capable of sending a second differential signal to a second external input unit through a pair of second signal lines, wherein the second external input unit comprising second resistors each coupled between a power rail in the second external input unit and one of the second signal lines; and
    a switching controller enabling the first transmission unit to transmit the first data on the set of input terminals or enabling the second transmission unit to transmit the first data on the set of input terminals, according to a mode selection signal.

2. The combined transmitter as claimed in claim 1, wherein the first transmission unit is a low voltage differential signaling (LVDS) transmitter.

3. The combined transmitter as claimed in claim 1, wherein the second transmission unit is a transition minimized differential signaling (TMDS) transmitter.

4. The combined transmitter as claimed in claim 1, wherein the first transmission unit is able to transmit the first data on the set of input terminals to the first external input units in a LVDS mode, the second transmission unit is able to transmit the first data on the set of input terminals to the second external input units in a TMDS mode, and the first and second transmission units are both disabled in a power down mode.

5. The combined transmitter as claimed in claim 4, further comprising:
    a phase locked loop (PLL) coupled to the first and second transmission units; and
    a clock buffer generating first, second and third clock signals to the first and second transmission units and the PLL selectively according to an input clock and the mode selection signal;
    wherein the PLL generates a first set output clock signals to the first transmission unit in the LVDS mode and generates a second set output clock signals to the second transmission unit in the TMDS mode, according to the third clock signal and the mode selection signal.

6. The combined transmitter as claimed in claim 4, wherein the switching controller, according to the mode selection signal and a power down selection signal, disables the first and second transmission units, the PLL and the clock buffer in the power down mode.

7. The combined transmitter as claimed in claim 5, wherein the first transmission unit comprises:
    a first serializer coupled to the set of input terminals to convert the first data, the first clock signal, and the first set of output clock signals to first data streams; and
    a LVDS driving unit, comprising the plurality of first drivers, coupled to the first serializer to transmit the first data streams to the corresponding first external input units.

8. The combined transmitter as claimed in claim 5, wherein the second transmission unit comprises:
    an encoding unit coupled to the set of input terminals to encode the first data to a second data according to the second clock signal;
    a second serializer coupled to the encoding unit to convert the second data, the second clock signal, and the second set of output clocks to second data streams; and
    a TMDS driving unit, comprising the plurality of second drivers, coupled to the second serializer to transmit the second data streams to the corresponding second external input units.

9. The combined transmitter as claimed in claim 5, wherein, in the LVDS mode, the clock buffer generates the first clock signal to the first transmission unit and the third clock signal to the PLL according to the input clock and the mode selection signal, and the PLL generates the first set of output clock signal to the first transmission unit.

10. The combined transmitter as claimed in claim 5, wherein, in the TMDS mode, the clock buffer generates the second clock signal to the second transmission unit and the third clock signal to the PLL according to the input clock and the mode selection signal, and the PLL generates the second set of output clocks to the second transmission unit.

11. A combined transmitter for transmitting video signals, comprising:
    a set of input terminal for receiving first data;
    a first transmission unit, coupled to the set of input terminal, comprising a plurality of first drivers capable of sending a first differential signal to a first external input unit through a pair of signal lines, wherein the pair of signal lines of each first drivers coupled to a set of common output line, wherein the first external input unit comprises a first resistor coupled between the pair of signal lines;
    a second transmission unit, coupled to the set of input terminals, comprising a plurality of second drivers each capable of sending a second differential signal to a second external input unit through a pair of signal lines, wherein the pair of signal lines of each second drivers coupled to the set of common output line, wherein the second external input unit comprises two resistors each coupled between a power rail in the second external input unit and one of the pair of signal lines; and a switching controller enabling the first transmission unit to transmit the first data on the set of the input terminal or enabling the second transmission unit to transmit the first data on the set of the input terminal, according to a mode selection signal.

12. The combined transmitter as claimed in claim 11, wherein the first transmission unit is a low voltage differential signaling (LVDS) transmitter.

13. The combined transmitter as claimed in claim 11, wherein the second transmission unit is a transition minimized differential signaling (TMDS) transmitter.

14. The combined transmitter as claimed in claim 11, wherein the first transmission unit is able to transmit the first data on the set of input terminals to the first external input units in a LVDS mode, the second transmission unit is able to transmit the first data on the set of input terminals to the second external input units in a TMDS mode, and the first and second transmission units are both disabled in a power down mode.

15. The combined transmitter as claimed in claim 14, further comprising:

a phase locked loop (PLL) coupled to the first and second transmission units; and a clock buffer generating first, second and third clock signals to the first and second transmission units and the PLL selectively according to an input clock and the mode selection signal;

wherein the PLL generates a first set of output clock signals to the first transmission unit in the LVDS mode and generates a second set of output clock signals to the second transmission unit in the TMDS mode, according to the third input clock and the mode selection signal.

16. The combined transmitter as claimed in claim 14, wherein the switching controller, according to the mode selection signal and a power down selection signal, disables the first and second transmission units, the PLL and the clock buffer in the power down mode.

17. The combined transmitter as claimed in claim 15, wherein the first transmission unit comprises:

a first serializer coupled to the set of input terminals to convert the first data, the first clock signal, and the first set of output clock signals to first data streams; and a LVDS driving unit, comprising the plurality of first drivers, coupled to the first serializer to transmit the first data streams to the first external input units.

18. The combined transmitter as claimed in claim 15, wherein the second transmission unit comprises:

an encoding unit coupled to the set of input terminals to encode the first data to second data according to the second clock signal;

a second serializer coupled to the encoding unit to convert the second data, the second clock signal, and the second output clock signals to second data streams; and a TMDS driving unit, comprising the plurality of second drivers, coupled to the second serializer to transmit the second data streams to the second external input units.

19. The combined transmitter as claimed in claim 15, wherein, in the LVDS mode, the clock buffer generates the first clock signal to the first transmission unit and the third clock signals to the PLL according to the input clock and the mode selection signal, and the PLL generates the first set of output clock signals to the first transmission unit.

20. The combined transmitter as claimed in claim 15, wherein, in the TMDS mode, the clock buffer generates the second clock signal to the second transmission unit and the third clock signal to the PLL according to the input clock and the mode selection signal, and the PLL generates the second set of output clock signal to the first transmission unit.

* * * * *